July 13, 1937.  L. F. CARTER  2,087,018
ELECTRIC RECIPROCATING HAND TOOL
Filed April 27, 1936
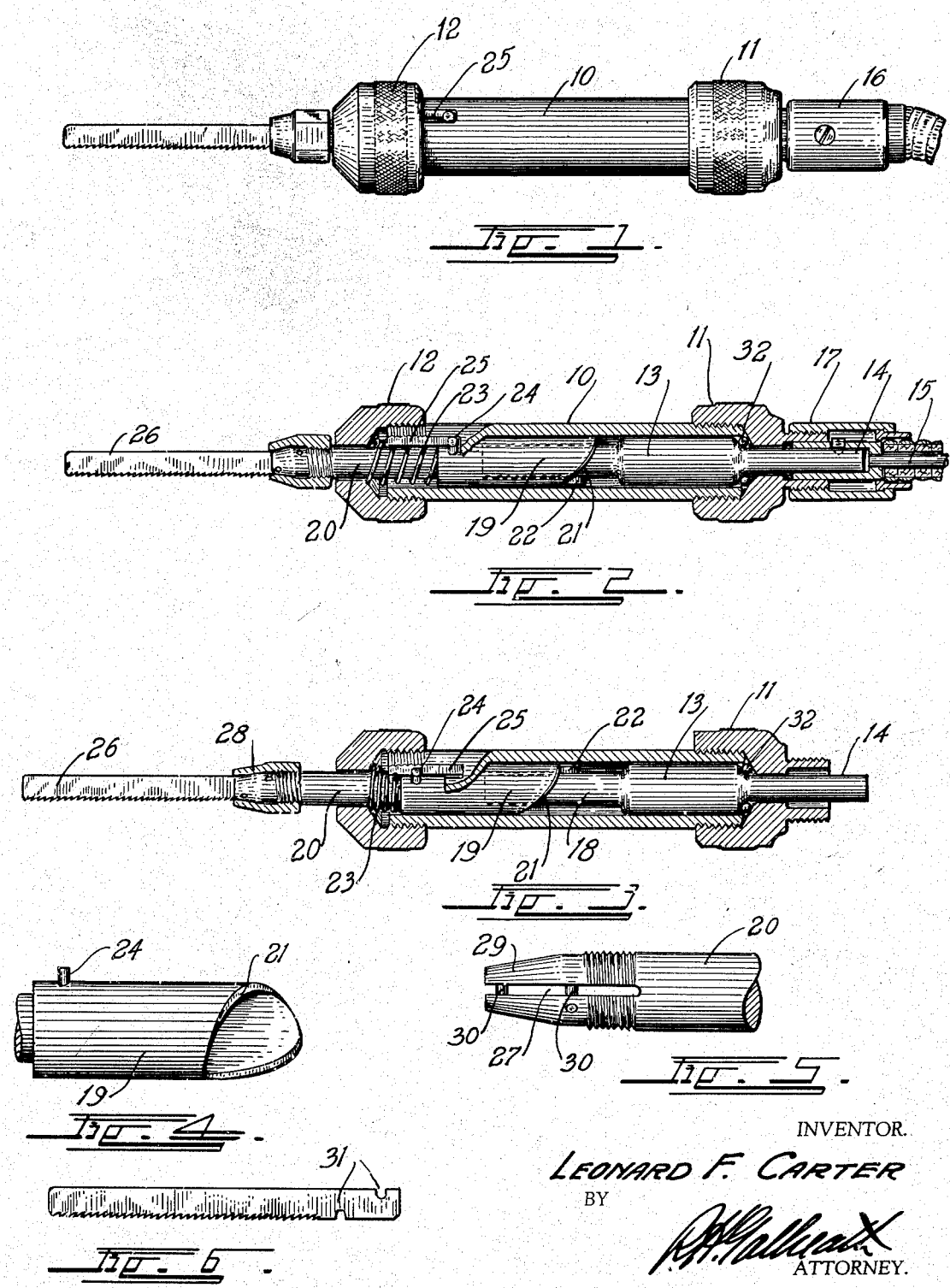
INVENTOR.
LEONARD F. CARTER
BY
ATTORNEY.

Patented July 13, 1937

2,087,018

UNITED STATES PATENT OFFICE 2,087,018

ELECTRIC RECIPROCATING HAND TOOL

Leonard F. Carter, Colorado Springs, Colo.

Application April 27, 1936, Serial No. 76,628

1 Claim. (Cl. 143—68)

This invention relates to a reciprocating attachment for use on the extremity of a flexible shaft for operating any reciprocating tool such as a saw blade or the like.

The principal object of the invention is to provide a small compact device which can be easily brought to the work and held in the hand and moved to follow any desired cutting lines in cutting or forming any desired material. The invention can be used for cutting out grill and scroll work from sheet material or can be used for cutting or working metal in difficultly accessible places in machine shops and assembling plants.

Another object of the invention is to provide means for attaching a saw or other cutting blade to the device so that it will be securely clamped into position from a single end thereof.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation of the complete tool, illustrating it attached to the extremity of a suitable flexible shaft.

Fig. 2 is a longitudinal section thereof in the retracted position.

Fig. 3 is a similar section in the extended position.

Fig. 4 is a detail view of the inner extremity of the reciprocating member.

Fig. 5 is a detail view of the tool engaging extremity of the reciprocating member.

Fig. 6 illustrates a typical saw blade of the type intended for use in the invention.

The invention comprises a tubular shell 10 closed at its rearward extremity by a rear threaded cap 11 and at its forward extremity by a front threaded cap 12. Within the tubular shaft 10 is a rotary driving member 13 having an extending shaft stud 14 for attachment to the extremity of a suitable flexible shaft 15. The sheath for the flexible shaft indicated at 16 is threaded onto a threaded nipple 17 on the rear cap 11 so as to prevent the housing 10 from rotating with the shaft 15.

The driving member 13 is provided with a forwardly extending extremity 18 of reduced diameter which fits into a socket in a reciprocating member 19. A tool stud 20 projects forward from the inner extremity of a reciprocating member 19. The rearward extremity of a member 19 is contoured so as to form a cam surface 21. This cam surface rises for approximately 270°, thence descends to its original starting point in about 90°. The cam surface 21 is constantly pressed against a roller stud 22 on the driving member 13, by means of a compression spring 23, and the member 19 is prevented from rotating by means of a key pin 24 which projects into a longitudinally extending slot 25 in the housing 10.

While the invention is particularly designed for holding a saw blade, it is conceivable of course that it could be used to hold any tool whose operation requires a reciprocating motion as for instance, a chisel, routing tool, file, abrasive blade, etc. As illustrated, it is holding a saw blade 26.

The saw blade is fitted into a slot 27 in the extremity of the member 20. The two sides of the slot are clamped against the saw blade by means of a clamping cap 28 which, as it is threaded onto the member 20, travels against a beveled surface 29 thereon to flex the bifurcated extremity and close the slot 27. To more securely hold the saw in position, two locking pins 30 are provided. Each of these pins is secured in one of the furcations of the stud 20, and slides within the other furcation. The extremity of the saw is notched as indicated at 31, in Fig. 6 so that it may be passed over the first pin 30 and under the second pin 30 before the cap 28 is tightened into position.

It can be readily seen that as the flexible shaft 15 rotates the rotating member 13, the action of the roller stud 22 against the cam face 21 will force the member 19 forwardly, then allow it to return under the action of the spring 23, causing a rapid reciprocation of the blade 26. The blade will make one complete forward and backward reciprocation and each revolution of the member 13. The rearward thrust on the member 13 occasioned by the spring 23 is absorbed in suitable ball bearings 32.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

A hand tool reciprocating device comprising: a tubular housing; a driving member rotatably mounted in one extremity of said housing; a reduced forward extremity on said driving member extending from the rearward extremity of said housing; a hollow sleeve mounted in the other extremity of said housing about the reduced forward extremity on said driving member, the rearward edges of said sleeve having an irregular cam contour; a key member projecting from said sleeve into a longitudinal slot in said housing to prevent said sleeve from rotating; a shaft extending axially from said sleeve through the forward extremity of said housing; a rear cap closing said housing and providing a bearing for the reduced rearward extremity on said driving member; a thrust bearing between said driving member and said rear cap; a front cap closing the forward extremity of said housing and providing a bearing for said shaft; a stud projecting from the reduced forward extremity of said driving member; a compression spring interposed between said front cap and said hollow sleeve acting to maintain the contoured rear edge thereof against said stud; means for attaching a tool to the forward extremity of said shaft; means for attaching a flexible shaft housing to said rear cap; and means for attaching a flexible shaft to the reduced rearward extremity of said driving member.

LEONARD F. CARTER.